Jan. 31, 1928.  1,657,853
H. D. CHURCH
FRAME CONSTRUCTION FOR MOTOR VEHICLES
Filed May 26, 1927
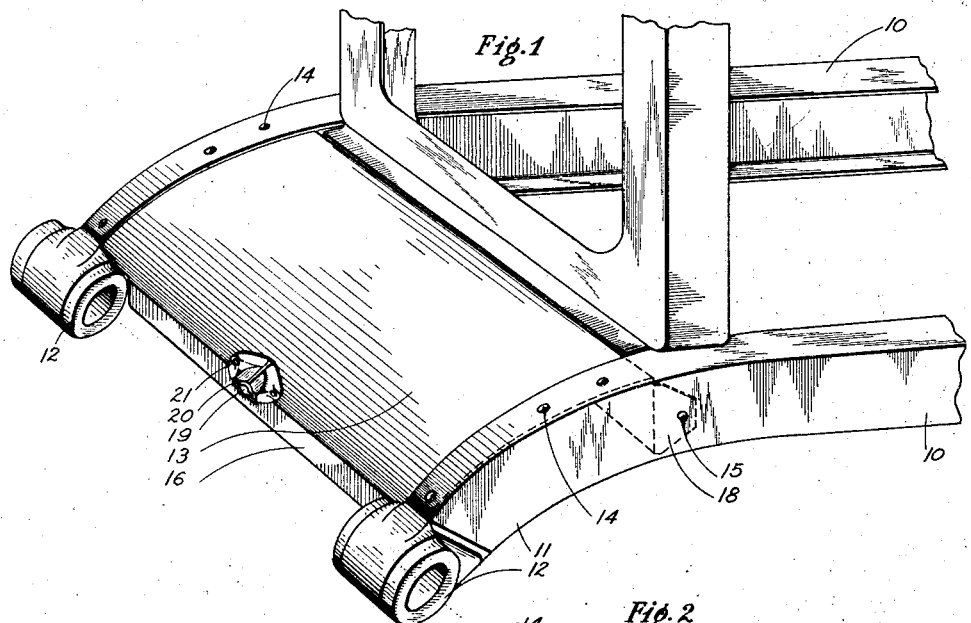
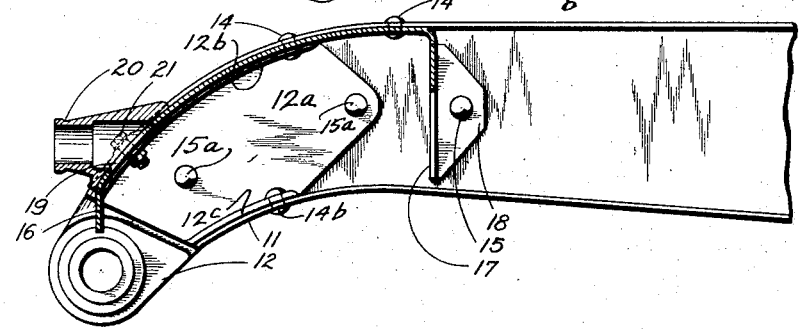
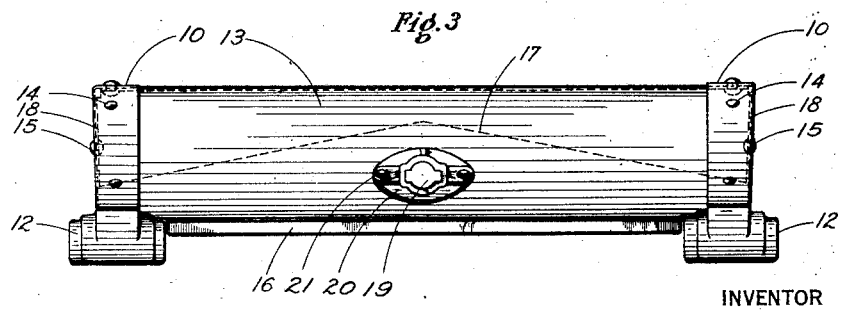
INVENTOR
HAROLD D. CHURCH.
BY
ATTORNEY Patented Jan. 31, 1928.

1,657,853

UNITED STATES PATENT OFFICE.

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO.

FRAME CONSTRUCTION FOR MOTOR VEHICLES.

Application filed May 26, 1927. Serial No. 194,451.

This invention relates to motor vehicles and particularly to an improvement in the construction of the vehicle chassis, therefor.

In motor vehicles, it has been found that the frame side members are susceptible to relative vertical vibration and deflection caused by the stresses transmitted through the necessarily heavy springs and by the individual vertical movement of the wheels into various positions of relatively angular relation. This flexibility of the frame particularly at the forward portion thereof, impairs the control of the steering mechanism, causes undue wear in the bearings throughout the steering gear linkage and wheels, and subjects the body to deleterious strains and distortions.

In order to minimize the frame deflections and to influence a neutralized uniform spring reaction on the entire frame, it has been found that the vehicle frame side members must be rigidly united at their forward terminating ends by a frame cross member which is so formed as to provide an inflexible lateral connection and also afford a support or truss capable of bracing the frame in a vertical plane.

It is the object, therefore, of this invention to provide a chassis cross member which is insusceptible of distortion per se, and which is adapted to rigidly unite the frame side members.

It is the further object of this invention to provide a frame cross member of an æsthetic design which will not only unite the frame side rails but will subserve the purpose of the sheet metal splash plate customarily employed at the forward end of the chassis below the radiator in a motor vehicle.

Other objects and advantages more or less ancillary to the foregoing and the manner in which the various objects are obtained reside in the specific construction of elements peculiar to the structure as will become apparent from a more complete examination of this specification, in the claims of which there are assembled and pointed out certain combinations of parts and specific constructions indicative of the scope and spirit of the invention.

In the drawings which illustrate one embodiment of the invention:

Figure 1 is a view in perspective of a fragmentary portion of the forward end of the vehicle chassis embodying the invention.

Figure 2 is a vertical section taken in a plane indicated by the line 2—2 in Figure 1.

Figure 3 is an elevational view of the front of a vehicle chassis including the frame cross member embodied in this invention.

Referring to the drawings in which like symbols designate corresponding parts, the vehicle chassis comprises a pair of frame side rails 10 of the customary channel section, terminating with arcuate spring horns 11 to which there is rigidly attached, in manner to be hereinafterwards described, spring supporting connections 12. These connections have integrally formed U-shaped extensions 12$^a$ which conform to and fit within the horns 11.

Intermediate the frame members 10 and disposed between the flanges 12$^b$ of the connections 12 and the upper flanges of the side rails 10, is a steel plate or frame cross member 13, which conforms to the upper flanges of the side rails 10, and extends throughout the arcuate portion thereof. The plate 13 is preferably formed with a depending flange or rolled stiffening web 16 at its forward end, and an angulated flange or ledge 17 depending from its rear end and provided with laterally disposed ears 18 contiguous with the central portion of the frame side rails 10. The flange 17, in the instant case, is cut away at its central portion 19, to accommodate the starting crank which may be supported by a bracket 20, mounted on the outer face of the frame cross member 13, and secured thereto by bolts 21.

The cross member 13 and the spring supporting connections 12 are, respectively, secured to the frame members 10 by means of rivets 14, 14$^a$ and 15, and rivets 14$^a$, 14$^b$ and 15$^a$. It is to be noted that the rivets 14$^a$ extend through both cross member 13 and flanges 12$^a$ of the spring connections 12.

By employing a cross member of the type herein illustrated and described, the frame side rails will not only be rigidly united transversely but will be braced or trussed in a vertical plane as may be illustrated by taking diagonal sections through the arcuate cross member each of which is indicative of a vertical truss incremental to the rigidity of the structure or the diagonal bracing thereof. Furthermore, the rigidity of the vehicle frame may also be increased in a longitudinal plane and the chassis may withstand shocks or blows imposed upon the end of one of the frame side rails without deformation of the cross members or injury in the alignment of the mechanisms supported by the frame members or their appurtenances.

Although the foregoing description is necessarily of a detailed character, in order that the invention may be completely set forth, it is to be understood that the specific terminology is not intended to be restrictive or confining, and that various rearrangement of parts and modifications of structural detail may be resorted to without departing from the scope or spirit of the invention as herein claimed.

What is claimed:

1. In a vehicle chassis a pair of frame side rails having arcuate terminating ends, an arcuate front frame cross member rigidly connected to said frame side rails and having a pair of depending flanges, one flange of which is adapted to be held in securement with the frame.

2. In a vehicle chassis a pair of flanged frame side rails formed with forwardly disposed arcuated ends, an arcuate front frame cross member intermediate the side rails and rigidly connected to one of the flanges thereof, the frame cross member having forward and rearward depending flanges, the last named flange having laterally disposed ears adapted to be secured to a web of the said vehicle frame side rails.

3. In a vehicle chassis a pair of frame side rails having arcuate terminating ends, an arcuate front frame cross member rigidly connected to said frame side rails and having a flange depending from its rearward edge, said flange having laterally disposed ears adapted to be secured to the said vehicle frame side rails.

In testimony whereof I hereunto affix my signature this 23 day of May, 1927.

HAROLD D. CHURCH.